United States Patent [19]
Doyle et al.

[11] Patent Number: 5,984,504
[45] Date of Patent: Nov. 16, 1999

[54] SAFETY OR PROTECTION SYSTEM EMPLOYING REFLECTIVE MEMORY AND/ OR DIVERSE PROCESSORS AND COMMUNICATIONS

[75] Inventors: James P. Doyle, North Versailles; Robert W. Thompson, Jr., Pittsburgh; Simon Lowenfeld, Westmoreland; Jerzy Gutman, Plum, all of Pa.

[73] Assignee: Westinghouse Electric Company LLC, Pittsburgh, Pa.

[21] Appl. No.: 08/873,350

[22] Filed: Jun. 11, 1997

[51] Int. Cl.[6] .............................. G06F 19/00; G06B 9/02; G21C 7/36
[52] U.S. Cl. ...................... 364/468.15; 364/187; 376/216
[58] Field of Search .......................... 395/200; 371/68.1; 376/216; 364/184, 187, 133, 468.15

[56] References Cited

U.S. PATENT DOCUMENTS

| | | | |
|---|---|---|---|
| 3,858,191 | 12/1974 | Neuner et al. ........................ | 340/870.2 |
| 3,895,223 | 7/1975 | Neuner et al. .......................... | 371/68.1 |
| 4,427,620 | 1/1984 | Cook ........................................ | 376/216 |
| 4,804,515 | 2/1989 | Crew et al. .............................. | 376/216 |
| 5,142,623 | 8/1992 | Staab et al. .............................. | 395/200 |
| 5,392,320 | 2/1995 | Chao ........................................ | 376/215 |
| 5,519,603 | 5/1996 | Allbery, Jr. et al. ..................... | 364/133 |
| 5,588,132 | 12/1996 | Cardoza .................................. | 711/148 |

OTHER PUBLICATIONS

Code of Federal Regulations, 10CFR §50.62, pp. 697–698, Jan. 1, 1996.

J. Protic and V. Milutinovic, Reflective Memory System based on a Grid of buses that Slectively Uses Relaxed Memory Consistency Models, Sep. 14, 1997.

*Primary Examiner*—Albert DeCady
*Assistant Examiner*—Shelly A Chase

[57] ABSTRACT

A safety or protection system includes a plurality of divisions of first signals; a plurality of safety or protection subsystems each of which receives a corresponding one of the divisions of first signals and produces a corresponding plurality of second signals therefrom; and a reflective memory subsystem for communicating the second signals between the safety or protection subsystems.

23 Claims, 6 Drawing Sheets

SAFETY OR PROTECTION SYSTEM EMPLOYING REFLECTIVE MEMORY AND/ OR DIVERSE PROCESSORS AND COMMUNICATIONS

BACKGROUND OF THE INVENTION

1. Field of the Invention

This invention is directed to a safety or protection system and, more particularly, to such a system for a critical process such as a nuclear power plant.

2. Background Information

Many safety or protection systems require duplication in at least some portions of the system for safety and reliability. This duplication may take the form of redundant systems. For example, duplicate sensors, controllers, actuators and communication channels may be provided in separate independent subsystems to perform the identical function. Typically, in such a redundant case, the hardware and logic are identical in each of the subsystems.

In other cases, multiple, identical channels are provided to generate independent control signals which are voted to determine the final control signal to be applied to a single component. For instance, in a nuclear power plant, it is common to have protection systems which include four separate channels, each with its own sensors and controllers for generating a reactor trip signal in response to certain conditions in the plant. Voting logic trips the plant only if, for instance, two or more of the four channels generate a channel trip signal. In this instance also, it is conventional to have identical hardware and logic in each channel, thereby providing redundancy. See, for example, U.S. Pat. No. 4,804,515.

There is a growing concern over common mode failures in redundant safety or protection systems. By a common mode failure, it is meant, simultaneous, similar failures in corresponding elements, either hardware or software, of the system. One application for which these concerns are raised is the retrofitting of existing process control systems, like some existing nuclear power plants, where it is desired to control a single component with commands from two separate subsystems.

As disclosed in U.S. patent application Ser. No. 08/557, 532, filed Nov. 14, 1995, it is known in prior art instrumentation and control systems to utilize diverse redundant primary and backup control mechanisms, in which the processors and/or the software utilized therein are different, in order to preclude common mode failures. In the case of control mechanisms incorporating digital processors, different types of processors (e.g., from different manufacturers) are used to run different routines (e.g., implemented in different software languages) implementing common algorithms. Although diverse redundant control mechanisms are known, further improvements are possible.

As disclosed in U.S. patent application Ser. No. 08/628, 586, filed Apr. 4, 1996, it is also known to employ reflective memories for transmitting sensor signals and control signals between a modeling or simulation system and a stimulation system for such modeling or simulation system.

There is a need, therefore, for an improved safety or protection system which minimizes the possibility of common mode failures.

SUMMARY OF THE INVENTION

This and other needs are satisfied by the invention which is directed to a safety or protection system comprising a plurality of divisions of first signals; a plurality of safety or protection subsystems each of which receives a corresponding one of the divisions of first signals and produces a corresponding plurality of second signals therefrom; and reflective memory means for communicating the second signals between the safety or protection subsystems.

As another aspect of the invention, a safety or protection system for a critical process comprises at least two safety or protection sub-systems each of which comprises first means for monitoring a first one of the parameters and providing a second signal representative thereof to a first one of the divisions of first signals, second means for monitoring a second one of the parameters and providing a third signal representative thereof to a second one of the divisions of first signals, first processing means for processing the first division and the second signal and providing a first output, second processing means for processing the second division and the third signal and providing a second output, with the second processing means being substantially different from the first processing means, and the first and second outputs being redundant relative to the characteristic, first communication means for communicating the first division, the second signal and the first output to the others of the safety or protection sub-systems, second communication means for communicating the second division, the third signal and the second output to the others of the safety or protection sub-systems, with the second communication means being substantially different from the first communication means; and means for combining the first and second outputs of each of the safety or protection sub-systems to effect a safety or protection function for the critical process.

As a further aspect of the invention, a safety or protection system for a critical process comprises a plurality of safety or protection subsystems including first means for monitoring a first one of a plurality of parameters, each of which is representative of a characteristic of the critical process, and providing a second signal representative thereof to a first one of a plurality of divisions of first signals, second means for monitoring a second one of the parameters and providing a third signal representative thereof to a second one of the divisions of first signals, first processing means for processing the first division of first signals and the second signal and providing a first output, second processing means for processing the second division of first signals and the third signal and providing a second output, with the second processing means being substantially different from the first processing means, and the first and second outputs being redundant relative to the characteristic, and means for combining the first and second outputs, with each of the safety or protection subsystems receiving a corresponding one of the divisions of first signals and a corresponding one of the second and third signals, and with at least one of the first and second processing means producing a corresponding plurality of fourth signals therefrom; and reflective memory means for communicating the fourth signals between the safety or protection subsystems.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

As employed herein, the term "signal" shall expressly include, but not be limited to any input or output utilized for protection, safety, control and/or monitoring such as, for example, electrical or analog signals, digital signals, command signals, status signals, discrete signals, combined or compound signals, serial signals or serial messages.

As employed herein, the term "digital signal" shall expressly include, but not be limited to boolean signals (e.g., true or false, one or zero) and digitized analog signals.

As employed herein, the term "division" shall expressly include, but not be limited to one or more input signals.

As employed herein, the term "train" shall expressly include, but not be limited to one or more output signals.

Figure 1:
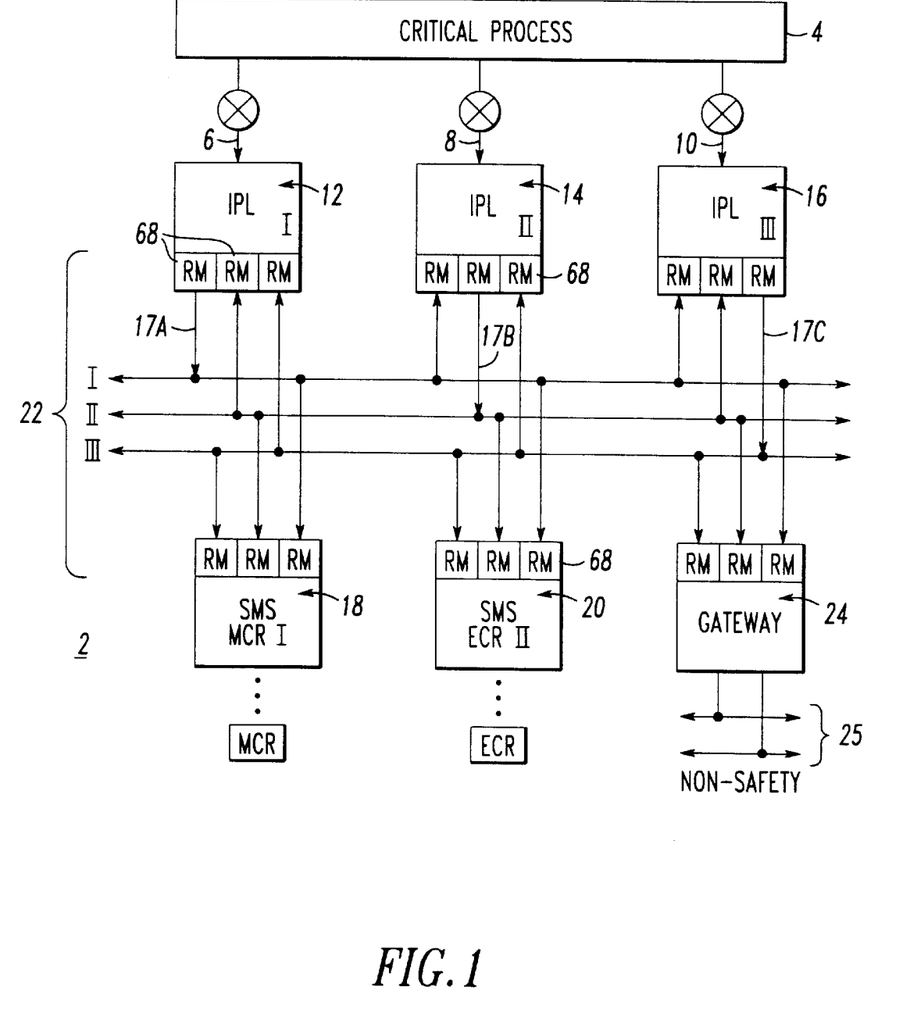
FIG. 1 is a block diagram of a protection and safety system employing reflective memories in accordance with the present invention.

Referring to FIG. 1, a protection and safety system 2 for a critical process 4, such as a nuclear power plant, is illustrated. The system 2 includes three divisions 6,8,10 of first signals, such as electrical signals; three protection subsystems 12,14,16; and two safety subsystems 18,20. In the exemplary embodiment, each of the three protection subsystems 12,14,16 receives a corresponding one of the divisions 6,8,10 of first signals and produces a corresponding plurality of second signals 17A,17B,17C, such as digital signals, therefrom. The system 2 also includes a reflective memory subsystem 22 for communicating the second signals 17A,17B,17C between the protection subsystems 12,14,16 and/or the safety subsystems 18,20.

As a non-limiting example, the protection subsystems 12,14,16 may include integrated protection logic (IPL) for reactor shutdown (trip or scram) or emergency core cooling logic (ECCL), as understood by those skilled in the art, for the nuclear power plant. The safety subsystems 18,20 may include a safety monitoring system (SMS), which is used for post accident monitoring of critical plant parameters, as also understood by those skilled in the art. In the exemplary embodiment, information to the reactor operator is carried by the reflective memory subsystem 22 to the safety monitoring systems 18,20 in respective main control room (MCR) and emergency control room (ECR), with redundancy provided through the separate systems 18,20 in these two different control rooms.

As shown in FIG. 1, a gateway 24 may be provided for connection between the reflective memory subsystem 22 and a non-safety redundant highway 25 to provide the second signals 17A,17B,17C, such as protection system process data and status information, to a plant computer system (not shown). The second signals 17A,17B,17C may be time tagged at the gateway 24 by a plant master time signal from the highway 25. The information communicated to the plant computer system may be used for post event monitoring and/or evaluation.

Figure 2:
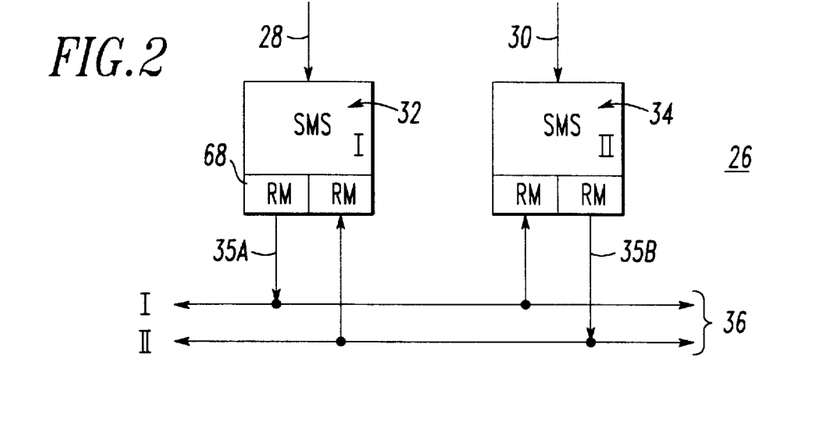
FIG. 2 is a block diagram of a safety system employing reflective memories in accordance with another embodiment of the invention.

As illustrated in FIG. 2, a safety system 26 includes two divisions 28,30 of first signals, such as electrical signals; and two safety subsystems 32,34. In this exemplary embodiment, each of the two safety subsystems 32,34 receives a corresponding one of the divisions 28,30 of first signals and produces a corresponding plurality of second signals 35A,35B, such as digital signals, therefrom. The system 2 also includes a reflective memory subsystem 36 for communicating the second signals 35A,35B between the safety subsystems 32,34.

Figure 3:
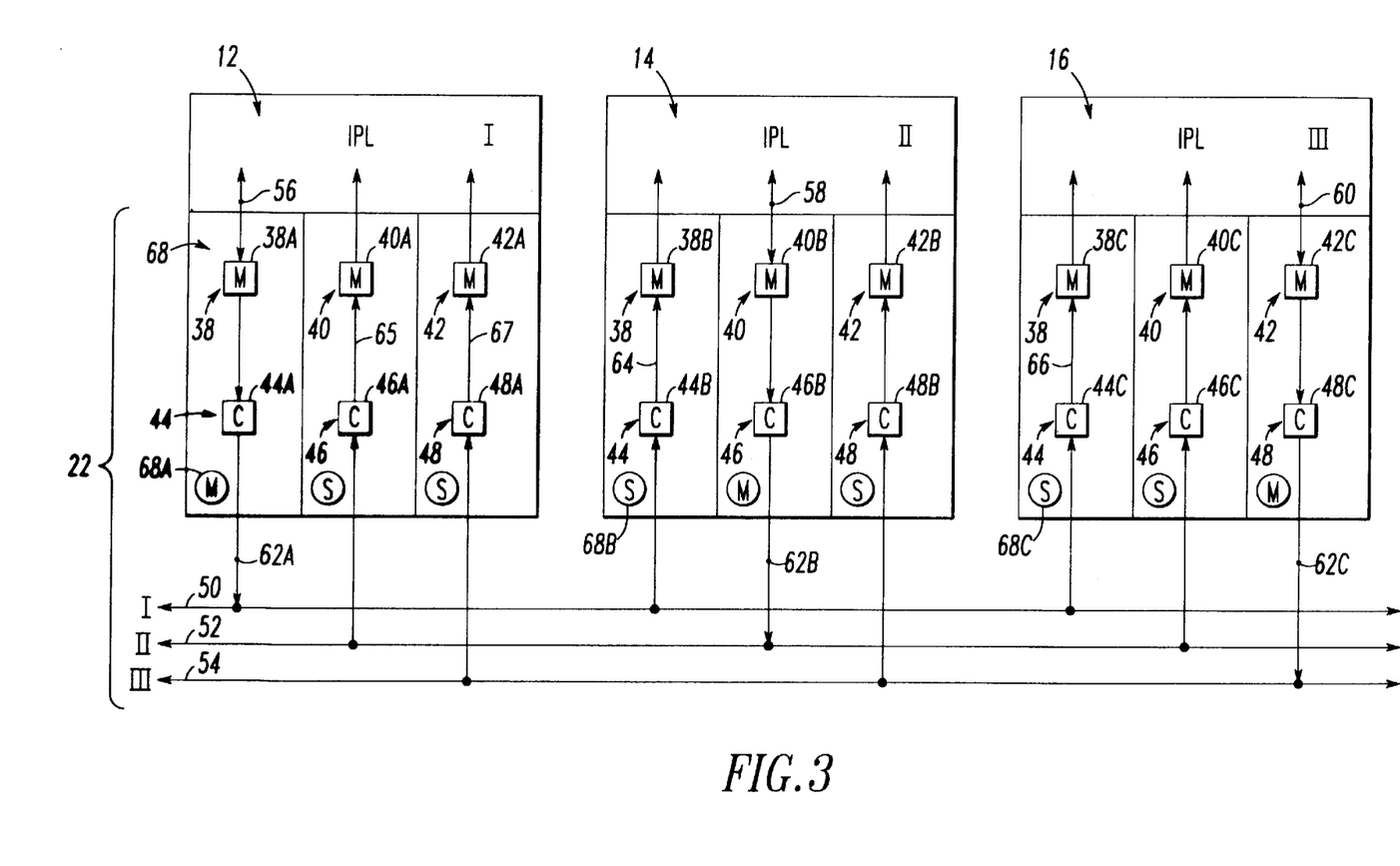
FIG. 3 is a block diagram of a protection system employing reflective memories in accordance with another embodiment of the invention.
Figure 4:
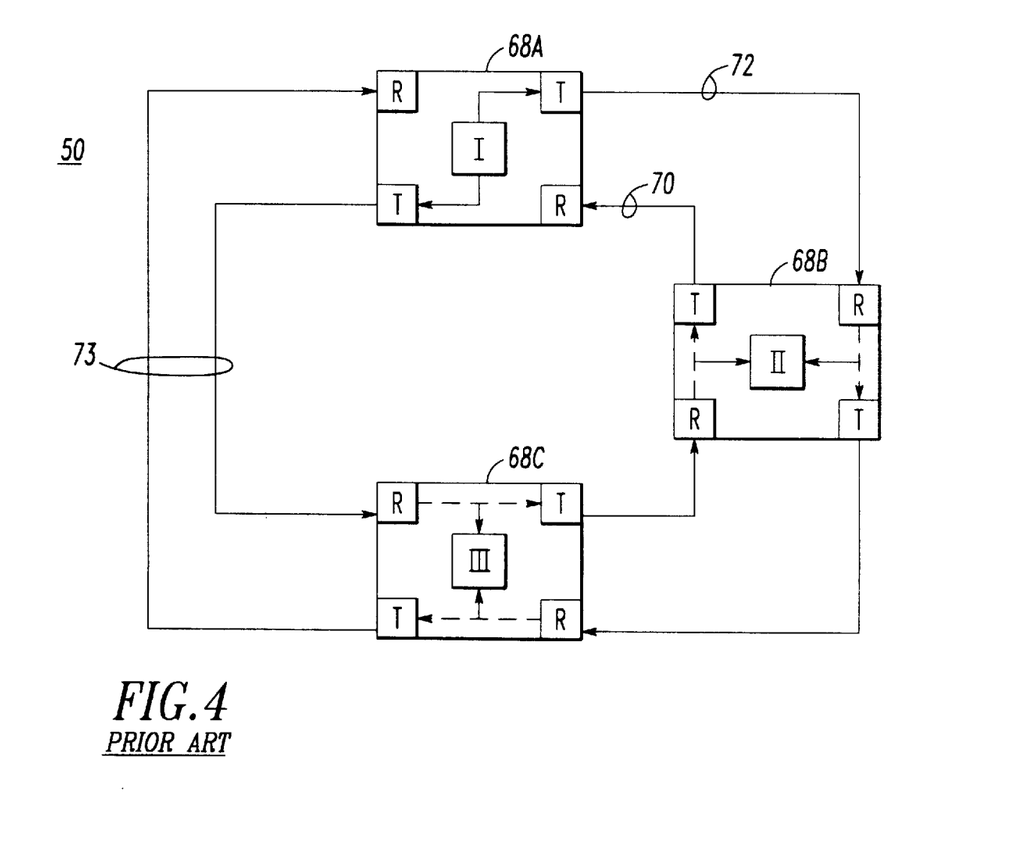
FIG. 4 is a block diagram of a counter-rotating ring communication subsystem.

Operation of the three-channel reflective memory subsystem 22 of FIG. 1 and the two-channel reflective memory subsystem 36 of FIG. 2 will be understood from reference to FIGS. 3 and 4. The exemplary reflective memory subsystem 22 includes, for each of the protection subsystems 12,14,16, three memory storage subsystems 38,40,42; three communication subsystems 44,46,48; and one of three communication channels 50,52,54. The memory storage subsystem 38A stores the second signals 56 of protection subsystem 12. Similarly, the memory storage subsystems 40B,42C of protection subsystems 14,16 store the second signals 58,60 of those protection subsystems 14,16, respectively.

The communication subsystem 44A retrieves the second signals 56 from the memory storage subsystem 38A of the protection subsystem 12 and sends third digital signals 62A, representative of the second signals 56, from the protection subsystem 12 on the communication channel 50 to the other two protection subsystems 14,16. For communication channel 50, the other two communication subsystems 44B,44C of the respective other two protection subsystems 14,16 receive the third signals 62A from the communication channel 50. In turn, these communication subsystems 44B, 44C store second digital signals 64,66, representative of the third signals 62A, in the memory storage subsystems 38B, 38C of the other two protection subsystems 14,16, respectively. In this manner, the communication subsystem 44A functions as a master (M) of the communication channel 50 and the communication subsystems 44B,44C function as slaves (S) of the master on that communication channel 50. In a similar manner, the communication subsystems 46B, 48C function as masters of the respective communication channels 52,54 and the communication subsystems 46A–46C,48A–48B function as slaves of the master on those communication channels 52,54, respectively.

The three communication channels 50,52,54 communicate the third digital signals 62A,62B,62C, representative of the second digital signals 56,58,60, from one of the protection subsystems 12,14,16 to the other pair of protection subsystems 14–16,12–16,12–14, respectively. In turn, the third digital signals 62A,62B,62C are stored in pairs of memory subsystems 38B–38C,40A–40C,42A–42B corresponding to pairs of communication subsystems 44B–44C, 46A–46C,48A–48B, respectively. For example, the communication subsystems 46A,48A store other second digital signals 65,67 representative of the third signals 62B,62C in corresponding memory subsystems 40A,42A, respectively.

In the exemplary embodiment, each of the reflective memories (RM) 68 of FIGS. 1–2 and 68A,68B,68C of FIG. 3 is a Model No. 5576 reflective memory marketed by VME Microsystems International, Inc., although the invention is applicable to any reflective memory subsystem in which a first memory subsystem sends or reflects memory information to one or more other memory subsystems. The communication channel 50, for example, forms an interface between the protection subsystem 12 and the other protection subsystems 14,16. As shown in FIG. 3, the protection subsystem 12 communicates with the protection subsystems 14,16 through the reflective memories 68A,68B,68C which reside in the respective protection subsystems 12,14,16. The reflective memories 68A,68B,68C of the protection subsystems 12,14,16 permit protocol-less data transfer therebetween.

As shown in FIG. 4, the communication channel 50 preferably is a fiber optic ring communications network, although the invention is applicable to a wide variety of communication channels (e.g., fiber optic datalinks, coaxial datalinks, coaxial networks). The exemplary communication channel 50 includes two counter-rotating fiber optic rings 70,72. These fiber optic rings 70,72, in addition to providing redundant data transfer paths, electrically isolate each of the divisions of electrical signals 6,8,10 of the protection subsystems 12,14,16 of FIG. 1 from the divisions of electrical signals 6,8,10 of the other protection subsystems 12,14,16 in order that the channel 50 is reaction free. In the event of a failure in one of the reflective memories (e.g., 68B), the information from the source memory (e.g., 68A) bypasses the failed memory in order that all other memories (e.g., 68C) connected to the channel 50 continue to receive the information. Also, in the event of a failure in both of the rings 70,72 (e.g., at point 73 on the left side of FIG. 4), the information from the source memory (e.g., 68A) is still sent to the destination memories (e.g., 68B, 68C) through ring 72 (at the right side of FIG. 4).

Figure 5:
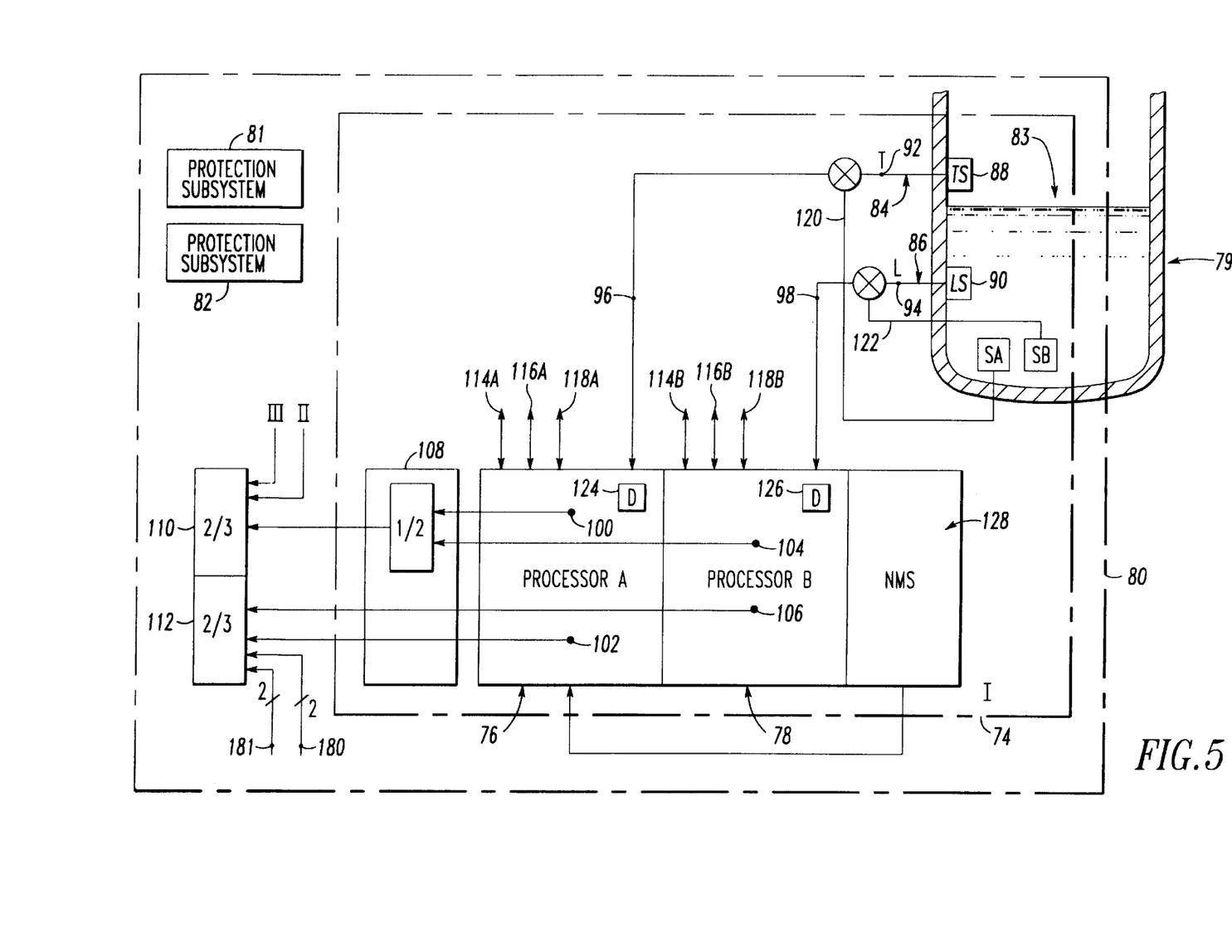
FIG. 5 is a block diagram of a protection subsystem employing diverse processors in accordance with another embodiment of the invention.

Referring to FIG. 5, a protection subsystem 74 employing diverse processors 76,78 is illustrated. The exemplary protection subsystem 74 protects a critical process 79, such as the exemplary nuclear reactor pressure vessel, and is part of a primary reactor protection system 80 which includes two other protection subsystems 81,82. The critical process 79 has one or more characteristics 83, such as conditions of the pressure vessel; and a plurality of parameters 84,86, each of which is representative of the characteristic 83. These parameters 84,86 (i.e., temperature (T) and level (L)) provide different indications of the characteristic 79 (i.e., the condition of the pressure vessel 79).

The pressure vessel 79 includes one or more temperature sensors (TS) 88, which monitor or sense temperatures of the vessel 79; and one or more level sensors (LS) 90, which monitor cooling water levels in the vessel 79. The sensors 88 and 90 provide an electrical signal 92 representative of the temperature and an electrical signal 94 representative of the level, respectively. In turn, the signals 92,94 are combined in the divisions 96,98 of electrical signals for input by the processors 76,78, respectively. The divisions 96,98 permit the respective processors 76,78 to monitor various conditions of the critical process 79 and provide corresponding protection functions therefor (e.g., preventing severe core damage, such as core melt; maintaining the integrity of the reactor coolant system (not shown); and allowing operating staff to safely shut down and monitor the nuclear power plant (not shown) including necessary remedial actions for frequent events).

The processor (A) 76 processes the first division 96, including the signal 92, and provides a first protection train, such as outputs 100,102, therefrom. The processor (B) 78 processes the second division 98, including the signal 94, and provides a second protection train, such as outputs 104,106, therefrom. As an important aspect of the invention, the processor (A) 76 and parameter 84 are substantially different from the processor (B) 78 and parameter 86, with the first outputs 100,102 and second outputs 104,106 being redundant relative to the characteristic 83. In other words, the diverse processors 76,78 employ different respective parameters 84,86 and substantially different mechanisms, as explained in greater detail below and in connection with FIGS. 6–7, to provide similar respective protection outputs 100,102 and 104,106, which are redundant relative to the characteristic 83. In this manner, a variety of common mode failures between the redundant processors 76,78 are obviated. The voting mechanisms 108,110,112 combine the outputs 100,102,104,106 to effect a safety or protection function, such as IPL for a nuclear reactor trip, for the critical process 79. In turn, the voting mechanisms 110 and 112 are interconnected with non-programmable logic (not shown) and respectively provide: (1) actuating signals to dedicated reactor trip switchgear (not shown) and actuating signals to turbine trip logic; and (2) actuating signals to engineered safety features equipment (not shown) through such non-programmable logic.

Preferably, the protection subsystem 74 is designed to be highly reliable and easily maintained. Availability is provided by employing fault-tolerant design principles, including sufficient redundancy and independence within the subsystem architecture, and system test features. Maintainability is facilitated through the use of two-out-of-three trip logic in the voting mechanisms 110,112.

For example, if a trip condition exists within one of the protection subsystems 74,81,82, then a logic trip is generated and output to the other two of such protection subsystems. Upon receipt of the same logic trip input from another one of these protection subsystems, a trip is generated and the associated dedicated two AC and two DC reactor trip breakers (not shown) are opened. These reactor trip breakers are wired in a matrix such that two sets (of both the AC and DC breakers) must register a two-out-of-three trip before an actual reactor trip occurs.

As shown with subsystem 74, three redundant communication channels 114A–114B, 116A–116B, 118A–118B are provided between the subsystems 74,81,82. Preferably, for the purpose of diverse communications, one set of the channels (e.g., 114B, 116B, 118B) employs reflective memories as discussed above in connection with FIGS. 1–4 for communication, and the other set of the channels (e.g., 114A, 116A, 118A) employs a diverse communication channel, such as conventional reaction free point-to-point fiber optic datalinks. Within each redundant set of the communication channels 114A–114B,116A–116B, 118A–118B, internal redundancy is implemented through the three protection subsystems 74,81,82, with the diverse processors 76,78 of each of these protection subsystems connected to one set of the three redundant communication channels 114A-116A-118A, 114B-116B-118B.

Internal redundancy is employed for two reasons. First, a failure of one of the processors 76,78 will not cause spurious actuator (e.g., valve or pump) operation. Second, during periodic on-line testing, each of the protection subsystems 74,81,82 may remain in operation and, hence, actuate its outputs on a real initiating event.

If the same parameter (e.g., a pressure) is needed for each of the diverse processors 76,78, then two sets of sensors (e.g., SA,SB) are provided, one for each of the processors 76,78. Also, in a typical protection function, each parameter is sensed three times, once for each of the subsystems 74,81,82. For example, in subsystem 74, the processors 76,78 convert the sensor analog signals 120,122 to corresponding digital (D) signals 124,126, respectively. In turn, the communication channel 114A transmits the digital signal 124, along with other digital signals corresponding to the first division 96, the signal 92 and the outputs 100,102, to the corresponding processor A of the other two protection subsystems 81,82. In a diverse manner, the communication channel 114B transmits the digital signal 126, along with other digital signals corresponding to the second division 98, the signal 94 and the outputs 104,106, to the corresponding processor B of the other two protection subsystems 81,82.

In each of the processors A,B of each of the subsystems 74,81,82, the three (i.e., one from that processor and two from the other two corresponding processors of the other two protection subsystems) digital sensor values are compared using an irrationality test algorithm as discussed below in connection with FIG. 6.

The protection subsystem 74 may also include a neutron monitoring system (NMS) 128. The NMS 128 interfaces with neutron detectors (not shown), converts neutron signals from the detectors to digital values, and communicates these digital values to the processor 76.

Figure 6:
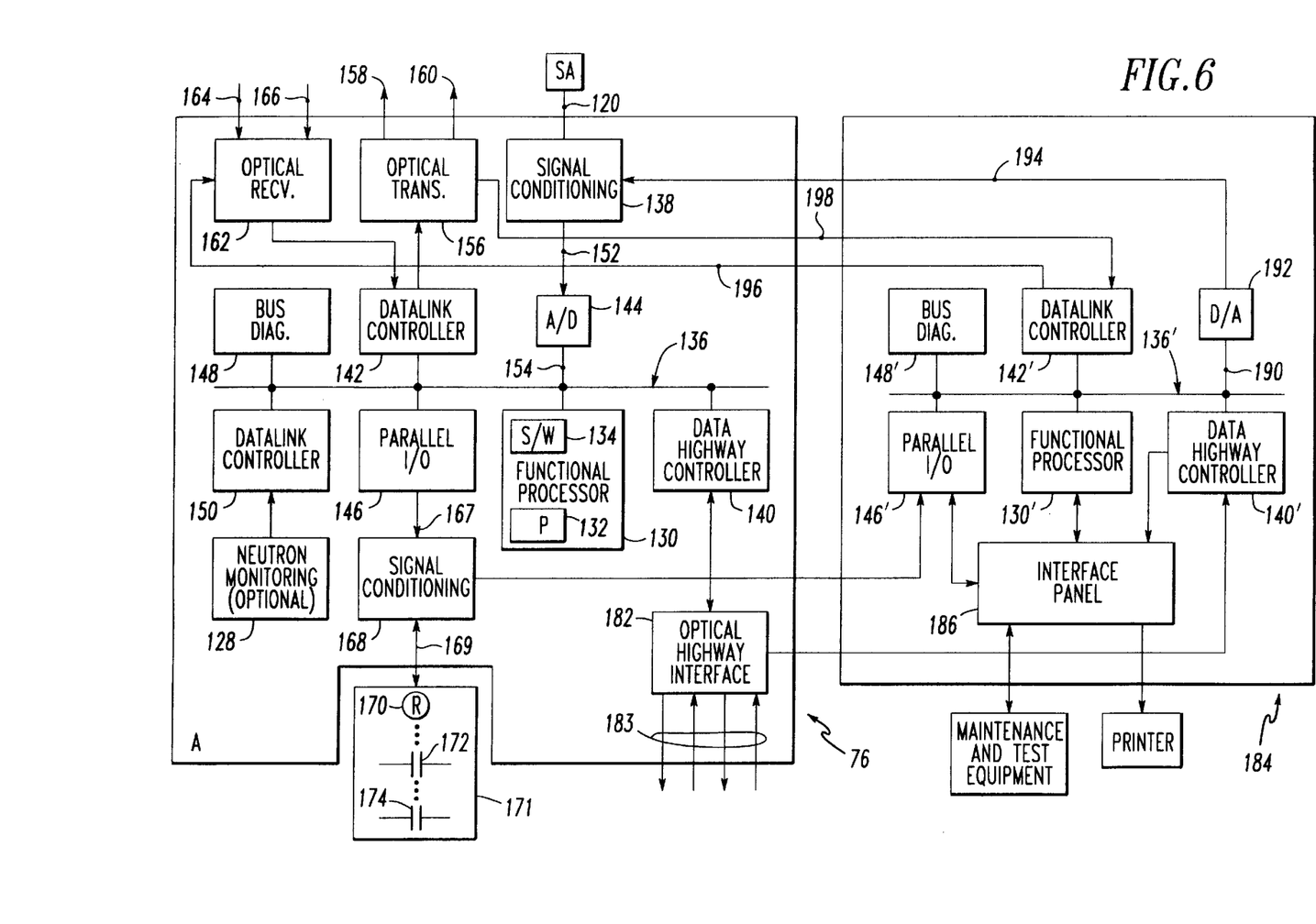
FIG. 6 is a functional block diagram of one of the diverse processors of FIG. 5.

Referring to FIG. 6, a functional block diagram of the processor (A) 76 is illustrated. The processor 76 includes a functional processor 130 which preferably has a first microprocessor ($\mu$P) 132 (e.g., an 80486 marketed by Intel), a first software strategy (S/W) 134 for execution by the first microprocessor 132, and a suitable interface to a first computer bus 136 (e.g., an IEEE Standard 796 computer bus (i.e., Multibus)). The processor 76 employs a philosophy of distributed processing in which various tasks are assigned to standardized modules in order that the engineering design of any given module may be handled as simply as possible. In this manner, the general purpose "host" functional processor 130 provides the requisite specific protection functions, and an array of generic "slave" modules 138,140,142,144,146, 148,150 perform respective exemplary functions such as: (1) analog input signal conditioning (e.g., powering sensors SA, analog multiplexing, analog filtering, analog signal conversion); (2) data highway data communications; (3) datalink data communications; (4) analog-to-digital (A/D) conversion; (5) parallel digital input/output (I/O) handling; (6) diagnostics for monitoring the health of the computer bus 136; and (7) other serial I/O scanning. In this manner, the exemplary processor 76 processes the signals 120 from the sensors SA and the communication channels 164,166. Preferably, microprocessors on some or all of these slave modules reduce the computing burden of the functional processor 130, thereby providing more processing power to perform the protection tasks.

Preferably, microprocessor interrupts are not employed in the software 134 which is designed, verified and validated in accordance with IEC Standards 880 and 987, and IEEE Standard 7-4.3.2. On power up, diagnostic and initialization software is run and, then, the functional processor 130 runs a continuously repeating execution loop. Every loop, a portion of loop diagnostic tests are run.

One or more of the exemplary process sensors SA may be powered by the analog input signal conditioning module 138 which typically receives one or more conventional (e.g., 4 to 20 mA range) signals 120 therefrom. The module 138 provides a surge withstand capability and converts the exemplary 4 to 20 mA range signals to conventional 0 to 5 V range signals 152. The A/D module 144 converts one or more of the analog signals 152 to corresponding digital sensor values 154. The functional processor 130 reads the digital sensor values 154 from memory (not shown) of the A/D module 144 through the computer bus 136.

The functional processor 130 converts the digital sensor values 154 to corresponding process values having engineering units (e.g., 123° C.). The process values, in turn, are transmitted over the computer bus 136 to the datalink controller module 142. The datalink controller module 142 is connected to an optical transmitter card 156 which interfaces to output fiber optic communication channels 158,160 of the communication channels 116A, 118A for the respective protection subsystems 81,82 of FIG. 5. Corresponding digital sensor values for the same parameter are received by the datalink controller module 142 which is also connected to an optical receiver card 162. The card 162 interfaces to input fiber optic communication channels 164,166 of the communication channels 116A,118A for the respective protection subsystems 81,82. In this manner, fiber optic datalinks are employed to transmit and receive information between the processors (A) 76 of each of the protection subsystems 74,81,82 of FIG. 5. In turn, the process values from the other two protection subsystems 81,82 are received by the functional processor 130 over the computer bus 136 from the datalink controller module 142.

The functional processor 130 employs the irrationality test algorithm in its software 134 to calculate a difference between each of the three pairs (i.e., from protection subsystems 74–81,81–82,74–82) of the digital sensor values and to compare this difference to a limit. A digital sensor value which differs from the other two is rejected and the remaining two are averaged. In turn, this average is compared to a protection setpoint to produce a partial trip signal (either true or false). If the difference between each pair of the digital sensor values exceeds the limit, then the result is interpreted as a partial trip from that functional processor 130. If none of the differences exceeds the limit, then the three digital sensor values are averaged and the resulting average is compared to the protection setpoint. In this manner, the functional processor 130 averages the three digital sensor values, while still rejecting any value differing from the others by more than a predetermined amount, and compares the average with the protection setpoint.

If the protection setpoint is exceeded (either high or low depending on the algorithm), the functional processor 130 directs the parallel I/O module 146 to output a suitable digital signal 167 to signal conditioning card 168. The output 169 of the card 168, in turn, de-energizes relay coil (R) 170 of voting relay card 171 which opens normally open contacts 172,174. These contacts 172,174 are in series with contacts 176,178, respectively, operated by the processor (B) 76 of FIG. 7. The pair of series contacts 172–176, 174–178 are connected in a two-out-of-three matrix in the voting mechanism 112 of FIG. 5 with another train, such as contact pairs 180,181, from the other two protection subsystems 81,82, respectively, in order to open reactor trip breakers (not shown) at two different actuation points and to drop rods (not shown) through control rod drive system electronics (not shown) for a third actuation point. In this manner, the output signals 102,106 of the three protection subsystems 74,81,82 of FIG. 5 are voted two-out-of-three (⅔) in the voting mechanism 112.

Continuing to refer to FIG. 6, the data highway controller module 140 connects to an optical highway interface card 182. This card 182 connects to a dual counter-rotating ring highway 183, such as an optical Ethernet highway. The highway 183 includes signals for emergency core cooling and diesel load sequencing which are transmitted to emergency core cooling logic cabinets (not shown).

Connected to the processor 76 is an automatic tester subsystem 184. When the protection subsystem 74 of FIG. 5 is not being tested, the automatic tester subsystem 184 is disconnected from the processor 76 by keyswitch and password through an interface panel 186. In that mode, the automatic tester subsystem 184 can read information from, but cannot write to, the processor 76 and protection subsystem 74.

The automatic tester subsystem 184 includes a functional processor 130'; four slave modules 140',142',146',148'; and a computer bus 136' which perform similar functions as the respective functional processor 130; four slave modules 140,142,146,148; and computer bus 136 of the processor 76. During periodic testing, the normal sensor signals 120 to the signal conditioning module 138 are disconnected by the automatic tester subsystem 184. The functional processor 130' outputs its own internally generated digital sensor signals 190 over the bus 136' to a digital-to-analog (D/A) converter module 192. In turn, the D/A converter module 192 outputs analog sensor signals 194 to the signal conditioning module 138 for use in place of the signals 120.

The fiber optic communication channels 164,166 from respective protection subsystems 81,82 of FIG. 5 are also disconnected from the optical receiver card 162 by the datalink controller 142' of the automatic tester subsystem 184 which substitutes its own internally generated datalink messages 196. The datalink controller 142' also receives datalink messages 198 from the optical transmitter card 156 which are sent by the datalink controller 142 of the processor 76.

During testing, the functional processor 130 continues its normal execution loop, totally unaware that it is being tested. The simulated analog sensor signals 194 are ramped up and down over their full range in order to verify proper operation of the protection setpoints and protection algorithms of the software 134 and to exercise all possible combinations of protection logic. In addition, the accuracy of the A/D conversion performed by A/D module 144 is checked by the automatic tester subsystem 184 as well as the time response of the processor 76.

Feedback to the automatic tester subsystem 184 is provided from the signal conditioning card 168 through parallel I/O module 146' for reactor trip, control rod insertion, and rod withdrawal block functions, and from the card 182 through data highway controller module 140' for the dual counter-rotating ring highway 183. While the processor (A) 76 is being tested, the processor (B) 78 continues to operate normally, essentially keeping all three protection subsystems 74,81,82 of FIG. 5 active.

Figure 7:
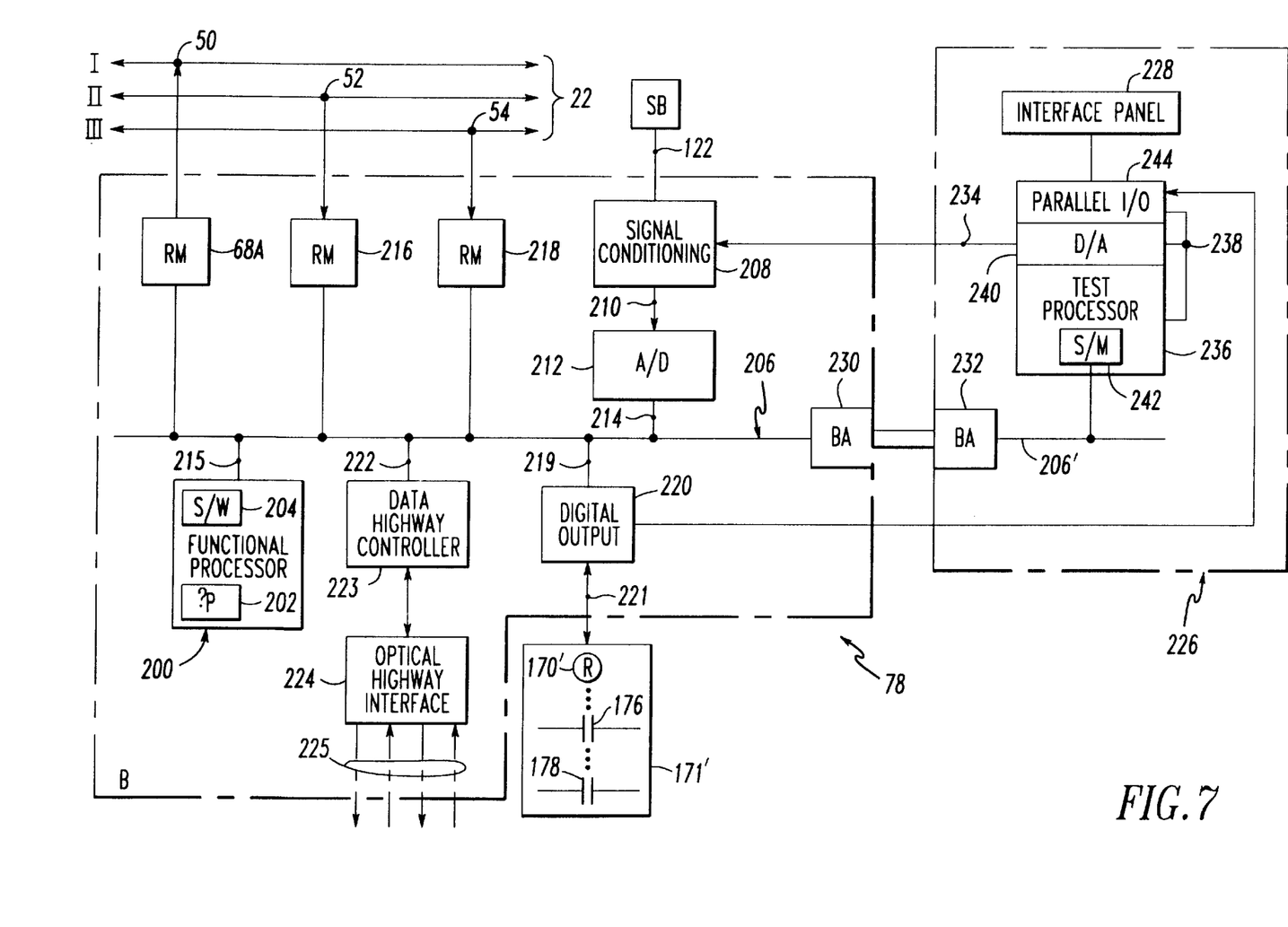
FIG. 7 is a functional block diagram of the other diverse processor of FIG. 5.

Referring to FIG. 7, a functional block diagram of the other diverse processor (B) 78 of FIG. 5 is illustrated. The processor 78 includes a functional processor 200 which preferably has a second microprocessor ($\mu$P) 202 (e.g., 68040 marketed by Motorola), a second software strategy (S/W) 204 for execution by the second microprocessor 202, and a suitable interface to a second computer bus 206 (e.g., an IEEE Standard 1014 computer bus (i.e., VME)). These components are completely different from the corresponding components of the processor 76 of FIG. 6. Furthermore, the software 204 is preferably written in the ADA language instead of the PL/M language used for the software 134 of FIG. 6. Also, the hardware and software design of the processor 78, including verification and validation, are preferably performed by an independent design team not involved in the design process of the processor 76. Accordingly, there are substantial differences between the processor 76 of FIG. 6 and the processor 78 of FIG. 7, although the invention is applicable to diverse processors having fewer or greater differences to preclude various common mode failures.

Each postulated trip initiating event for the critical process 79 of FIG. 5 is sensed by two diverse functions which are processed in separate diverse processors 76,78 which are coded differently. The protection subsystems 74,81,82 of FIG. 5, which employ the diverse processors 76,78, thereby form a diverse protection system which employs different processors 76,78 having different sensors and different style microprocessors, software, connections and software strategies which employ different plant parameters (e.g., temperature and level, pressure and temperature, level and pressure, neutron flux and temperature).

One or more of the exemplary process sensors SB of FIG. 7, which are different from the sensors SA of FIG. 6, may be powered by the analog input signal conditioning module 208 which typically receives one or more conventional analog signals (e.g., 4 to 20 mA, RTD, thermocouple) 122 therefrom. The exemplary module 208 provides a surge withstand capability and converts the analog signals 122 to conventional 0 to 5 V range signals 210. An A/D module 212 converts one or more of the analog signals 210 to corresponding digital sensor values 214. The functional processor 200 reads the digital sensor values 214 from memory (not shown) of the A/D module 212 through the computer bus 206.

The functional processor 200 converts the digital sensor values 214 to corresponding process values 215 having engineering units (e.g., 27 feet). The process values 215, in turn, are transmitted over the computer bus 206 to the reflective memory (RM) 68A which communicates these values over the communication channel 50 as discussed above in connection with FIG. 3. Corresponding digital sensor values for the same parameter are received by the reflective memories 216,218 of the communication channels 52,54 from the protection subsystems 81,82 of FIG. 5, respectively. In this manner, the reflective memory subsystem 22 of FIG. 1 is employed to transmit and receive information between the processors (B) 78 of each of the protection subsystems 74,81,82 of FIG. 5. In turn, the process values from the other protection subsystems 81,82 are received by the functional processor 200 over the computer bus 206 from the reflective memories 216,218.

The functional processor 200 employs an irrationality test algorithm in its software 204 and performs the requisite protection algorithms employing the signals 122. If the protection setpoint is exceeded (either high or low depending on the algorithm), the functional processor 200 directs a trip signal 219 to a digital output module 220 over the computer bus 206. The output 221 of the module 220, in turn, de-energizes relay coil (R) 170' of voting relay card 171', which is identical to the card 171 used in conjunction with the processor 76 of FIG. 6.

The voting relay cards 171,171 ' and the voting mechanisms 108,110,112 of FIG. 5 have components, such as the relay coils 170,170' and contacts 172,174,176,178, which are different than the other components of processors 76,78 and the sensors SA,SB, and which have a probability of failure (e.g., related to the mean time between failure) which is substantially less than the probability of failure of such other components.

Other emergency core cooling logic (ECCL) signals 222 from the functional processor 200 are passed to a data highway controller card 223 and, in turn, to an optical highway interface card 224 which is connected to an optical highway 225, such as an Ethernet optical highway, for the processor 78.

Unlike the bus diagnostic module 148 of FIG. 6, a separate bus diagnostic module is not employed in the processor 78. All diagnostic functions, including bus diagnostics, are preferably performed by the functional processor 200. Also, microprocessor interrupts are preferably not employed in the software 204 which is designed, verified and validated in accordance with IEC Standards 880 and 987, and IEEE Standard 7-4.3.2. On power up, diagnostic and initialization software is run and, then, the functional processor 200 runs a continuously repeating execution loop. Every loop, a portion of loop diagnostic tests are run. Although some of the software functions between the functional processor 130 of FIG. 5 and the functional processor 200 are similar, as discussed above, different coding languages and design teams are preferably employed for the software 134 of FIG. 5 and the software 204.

Continuing to refer to FIG. 7, an automatic tester 226 is connected to the processor 78. The automatic tester subsystem 226 receives information from local VME bus 206'. The VME buses 206,206' are interconnected through suitable VME bus adapters (BA) 230,232. The automatic tester subsystem 226 is a slave on the VME bus 206. When the protection subsystem 74 of FIG. 5 is not being tested, the automatic tester subsystem 226 is disconnected from the processor 78 by keyswitch and password through an interface panel 228.

The automatic tester subsystem 226 can read information from the processor 78 and the protection subsystem 74 but cannot write to them. Similarly, the functional processor 200 can write information to the automatic tester subsystem 226, but the automatic tester subsystem 226 cannot write to the VME bus 206. During periodic testing, the normal sensor inputs 122 to the signal conditioner 208 are disconnected by the automatic tester subsystem 226 and test signals 234 are substituted therefor.

The automatic tester subsystem 226 includes a suitable test processor 236 (e.g., based on a Motorola 68040 microprocessor) having a local processor bus 238 connected to a D/A converter 240 which provides the signals 234. Data from the other protection subsystems 81,82 of FIG. 5 is simulated in the shared memory 242 of the test processor 236 which has a suitable interface to the computer bus 206'.

With each execution loop, the functional processor 200 looks for a test flag in the shared memory 242. When this test flag appears, the functional processor 200 reads simulated data for the other two protection subsystems 81,82 from the shared memory 242 instead of from the reflective memories 216,218. The test flag, which is set by the test processor 236, operates as a soft test switch. Following testing, this soft test switch is returned to the normal (i.e., receive data from the communication channels 52,54) position. During testing, simulated input signals are ramped up and down over their full range verifying accuracy, protection setpoints and protection system function (e.g., logic combinations, time dependant functions).

Feedback from the voting relay card 171' through the digital output module 220 is input to a parallel I/O card 244 in the automatic tester subsystem 226. While the processor (B) 78 in one of the protection subsystems 74,81,82 is being tested, the processors (A) in such protection subsystems 74,81,82 of FIG. 5 continue to operate normally, essentially keeping all three subsystems 74,81,82 active.

It will be appreciated that while reference has been made to exemplary microprocessors, other processors known to those skilled in the art such as, for example, microcomputers, mini-computers or mainframe computers may be employed. It will also be appreciated that while reference has been made to exemplary modules, cards and computer buses, other components (e.g., integrated circuits, sub-modules, sub-cards) and other types of interconnection mechanisms (e.g., printed circuit boards, processor buses, integrated circuit connections) for interconnecting such components, known to those skilled in the art, may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A safety or protection system comprising:
    a plurality of divisions of first signals;
    a plurality of safety or protection subsystems each of which receives a corresponding one of said divisions of first signals and produces a corresponding plurality of second signals therefrom; and
    reflective memory means in each of said safety or protection subsystems for communicating the second signals between said each of said safety or protection subsystems and at least one other of said safety or protection subsystems.

2. The safety or protection system as recited in claim 1 wherein the first signals are electrical signals.

3. The safety or protection system as recited in claim 2 wherein said reflective memory means includes means for electrically isolating the electrical signals of one of said safety or protection subsystems from the electrical signals of the others of said safety or protection subsystems.

4. The safety or protection system as recited in claim 1 wherein the second signals are digital signals.

5. The safety or protection system as recited in claim 1 wherein said safety or protection subsystems include three protection subsystems.

6. The safety or protection system as recited in claim 5 wherein said reflective memory means includes, for each of the protection subsystems, three memory storage means, with each of said memory storage means for storing the second signals of a corresponding one of the protection subsystems.

7. The safety or protection system as recited in claim 1 wherein said safety or protection subsystems include two safety subsystems.

8. A safety or protection system comprising:
    a plurality of divisions of first signals;
    three protection subsystems each of which receives a corresponding one of said divisions of first signals and produces a corresponding plurality of second signals therefrom; and
    reflective memory means for communicating the second signals between said protection subsystems, wherein said reflective memory means comprises for each of the protection subsystems:
    three memory storage means, with each of said memory storage means for storing the second signals of a corresponding one of the protection subsystems;
    a first communication means for retrieving the second signals of said corresponding one of the protection subsystems from a corresponding one of said memory storage means and sending third signals representative of the second signals from said corresponding one of the protection subsystems to the other of the protection subsystems; and
    two second communication means, with each of said second communication means for receiving other third signals of other corresponding ones of the protection subsystems and storing other second signals representative of said other third signals in a corresponding one of said memory storage means.

9. A safety or protection system comprising:
a plurality of divisions of first signals;
three protection subsystems each of which receives a corresponding one of said divisions of first signals and produces a corresponding plurality of second signals therefrom; and
reflective memory means for communicating the second signals between said protection subsystems, wherein said reflective memory means comprises:
three communication channel means, with each of said communication channel means for communicating third signals from one of the protection subsystems to the other of the protection subsystems; and
for each of the protection subsystems:
three memory storage means, with each of said memory storage means for storing the second signals of a corresponding one of the protection subsystems,
a first communication means for retrieving the second signals of said corresponding one of the protection subsystems from a corresponding one of said memory storage means and sending the third signals representative of the second signals from said corresponding one of the protection subsystems on a corresponding one of said communication channel means to the other of the protection subsystems, and
two second communication means, with each of said second communication means for receiving the third signals of a corresponding one of said communication channel means and storing the second signals representative of said third signals in a corresponding one of said memory storage means.

10. The safety or protection system as recited in claim 9 wherein each of said communication channel means includes a pair of counter-rotating rings.

11. The safety or protection system as recited in claim 9 wherein said first communication means is master of the corresponding one of said communication channel means; and wherein said two second communication means are slaves of the other of said communication channel means.

12. A safety or protection system for a critical process, said critical process having a characteristic, a plurality of parameters each of which is representative of said characteristic, and a plurality of divisions of first signals, said safety or protection system comprising:
at least two safety or protection sub-systems each of which comprises:
first means for monitoring a first one of the parameters and providing a second signal representative thereof to a first one of the divisions of first signals,
second means for monitoring a second one of the parameters and providing a third signal representative thereof to a second one of the divisions of first signals,
first processing means for processing the first division and the second signal and providing a first output,
second processing means for processing the second division and the third signal and providing a second output, with said second processing means being substantially different from said first processing means, and said first and second outputs being redundant relative to said characteristic,
first communication means for communicating the first division, the second signal and the first output to the others of said at least two safety or protection sub-systems,
second communication means for communicating the second division, the third signal and the second output to the others of said at least two safety or protection sub-systems, with said second communication means being substantially different from said first communication means; and
means for combining the first and second outputs of each of said safety or protection sub-systems to effect a safety or protection function for said critical process.

13. The safety or protection system as recited in claim 12 wherein the first and second parameters provide different indications of the same characteristic.

14. The safety or protection system as recited in claim 13 wherein:
said characteristic is a condition of a reactor pressure vessel;
said vessel includes a temperature and a level therein;
the first parameter is the level of said vessel; and
the second parameter is the temperature of said vessel.

15. The safety or protection system as recited in claim 12 wherein:
said first means for monitoring, said second means for monitoring, said first processing means, and said second processing means include a plurality of first components having a probability of failure; and
said means for combining has at least one second component which is different than the first components of said first means for monitoring, said second means for monitoring, said first processing means, and said second processing means, with the second component having a probability of failure which is substantially less than the probability of failure of the first components.

16. The safety or protection system as recited in claim 12 wherein:
said first processing means includes first processor means and first software means for execution by said first processor means; and
said second processing means includes second processor means and second software means for execution by said second processor means, with at least one of said first processor means and said first software means being substantially different from at least one of said second processor means and said second software means, respectively.

17. The safety or protection system as recited in claim 16 wherein:
said first processor means includes a plurality of first components and first interconnection means for interconnecting the first components; and
said second processor means includes a plurality of second components and second interconnection means for interconnecting the second components, with the first components being substantially different from the second components, and the first interconnection means being substantially different from the second interconnection means.

18. The safety or protection system as recited in claim 16 wherein:
the first software means includes first processing strategy means for processing the second signal and the first signals of the first division; and
the second software means includes second processing strategy means for processing the third signal and the first signals of the second division, with the second processing strategy means being substantially different from the first processing strategy means.

19. The safety or protection system as recited in claim 12 wherein:
said first means for monitoring includes a first sensor for sensing a first electrical signal corresponding to the first parameter; and
said second means for monitoring includes a second sensor for sensing a second electrical signal corresponding to the second parameter.

20. A safety or protection system for a critical process, said critical process having a characteristic, a plurality of parameters each of which is representative of said characteristic, and a plurality of divisions of first signals, said safety or protection system comprising:
a plurality of safety or protection subsystems comprising:
first means for monitoring a first one of the parameters and providing a second signal representative thereof to a first one of the divisions of first signals,
second means for monitoring a second one of the parameters and providing a third signal representative thereof to a second one of the divisions of first signals,
first processing means for processing the first division of first signals and the second signal and providing a first output,
second processing means for processing the second division of first signals and the third signal and providing a second output, with said second processing means being substantially different from said first processing means, and said first and second outputs being redundant relative to said characteristic, and
means for combining the first and second outputs, with each of said safety or protection subsystems receiving a corresponding one of said divisions of first signals and a corresponding one of said second and third signals, and with at least one of the first and second processing means producing a corresponding plurality of fourth signals therefrom; and
reflective memory means for communicating the fourth signals between said safety or protection subsystems.

21. The safety or protection system as recited in claim 20 wherein said reflective memory means comprises for each of said safety or protection subsystems:
three memory storage means, with each of said memory storage means for storing the fourth signals of a corresponding one of said safety or protection subsystems;
a first communication means for retrieving the fourth signals of said corresponding one of said safety or protection subsystems from a corresponding one of said memory storage means and sending fifth signals representative of said fourth signals from said corresponding one of said safety or protection subsystems to the other of said safety or protection subsystems; and
two second communication means, with each of said second communication means for receiving other fifth signals of a corresponding one of said safety or protection subsystems and storing other fourth signals representative of said other fifth signals in a corresponding one of said memory storage means.

22. The safety or protection system as recited in claim 20 wherein:
said first processing means includes first processor means; and
said second processing means includes second processor means, with said second processor means being substantially different from said first processor means.

23. The safety or protection system as recited in claim 20 wherein:
said first processing means includes first processing strategy means for processing the first division of first signals and the second signal; and
said second processing means includes second processing strategy means for processing the second division of first signals and the third signal, with the second processing strategy means being substantially different from the first processing strategy means.

* * * * *